United States Patent

[11] 3,595,515

| [72] | Inventor | William B. Rollow<br>7509 Cantrell Road, Little Rock, Ark. 72207 |
|---|---|---|
| [21] | Appl. No. | 759,716 |
| [22] | Filed | Sept. 13, 1968 |
| [45] | Patented | July 27, 1971 |

[54] LAMINATED CONCRETE FORM
4 Claims, 3 Drawing Figs.

[52] U.S. Cl. .................................................. 249/134,
18/47 R, 25/118 R
[51] Int. Cl. ............................................. B29b 7/22,
B29b 7/34, B29b 7/36
[50] Field of Search ............................................. 25/118 W,
118 M, 131.5 C; 249/134, 1, 28, 32, 176, 177;
18/47 C, 47 M, 34 M, DIG. 30, DIG. 44

[56] References Cited
UNITED STATES PATENTS

| 1,176,005 | 3/1916 | Waite | 25/131.5 C |
| 2,878,659 | 3/1959 | Prance et al. | 249/134 X |
| 2,986,797 | 6/1961 | Aisenberg | 25/118 W |
| 3,118,960 | 1/1964 | Cook | 18/DIG. 44 |
| 3,350,049 | 10/1967 | Reiland | 249/134 X |
| 3,490,577 | 1/1970 | Grikscheit | 249/134 X |

*Primary Examiner*—J. Spencer Overholser
*Assistant Examiner*—R. L. Spicer, Jr.
*Attorney*—Brufsky, Staas, Breiner and Halsey ABSTRACT: A device for use in concrete slab-joist construction comprising a form over which concrete is poured, including a polymer sheet, and a polymer foam layer, which can be disposed over the outside of the sheet, or which layer may be disposed inwardly of the sheet, or which layer may be disposed both inside and outside of the sheet, so that the completed form is a laminated structure.

PATENTED JUL27 1971

3,595,515

INVENTOR.
WILLIAM B. ROLLOW,
BY
Berman, Davidson & Berman
ATTORNEYS.

LAMINATED CONCRETE FORM

The present invention relates to a form for concrete structure and more particularly, to a relatively thin form that is made of laminated material for use in supporting the concrete until it has set.

It is an object of the present invention to provide a relatively simple and lightweight form for use in concrete slab-joist construction that is laminated and has a relatively thin sheet of polymer and a layer of polymer foam forming a laminated lightweight form that can be easily handled by the workmen.

It is yet another object of the present invention to provide a laminated form for use in the forming of slab-joist concrete structure that is easy to manufacture, low in cost, and light in weight.

Yet another object of the present invention is to provide a relatively thin premolded polystrene foam shape which can be laminated either inside or outside or on both sides of a thin sheet of polymer material of premolded shapes so as to provide a form for utilization in the pouring of concrete slab-joists and the like.

It is yet another object of the present invention to provide a premolded polymer plastic sheet which molds compatibly to a polymer foam layer through the process of thermal expansion in order to provide a lightweight form for use in concrete structures.

Other objects and advantages of the present invention will become readily apparent from the following detailed description when considered in connection with the accompanying drawing forming a part thereof, and in which.

Figure 1:
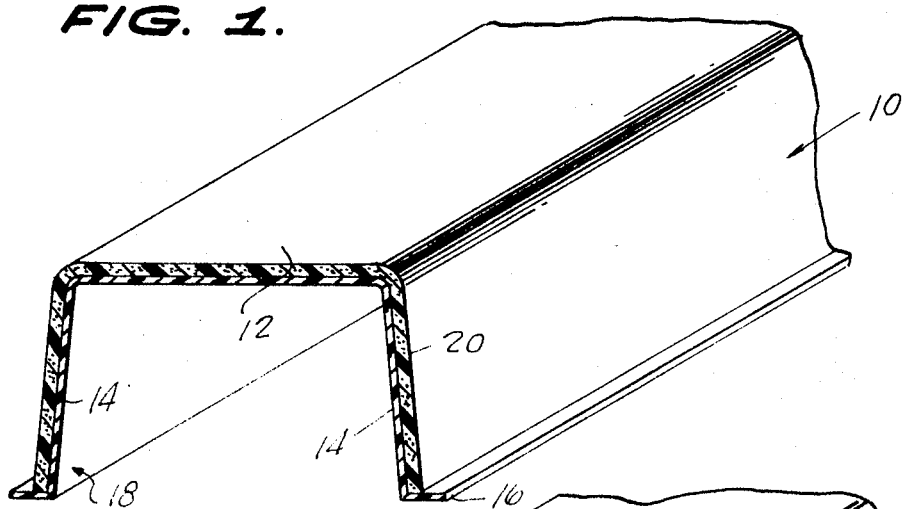
FIG. 1 is a perspective view illustrating the embodiment of the present invention.

Referring to the drawings, the reference numeral 10 generally designates a laminated form for use in concrete slab-joist construction and over which the plastic concrete is poured until it sets or hardens. Referring to FIG. 1, the form embodied in the present invention has a substantially horizontal top 12 with sides 14 that are diagonally inclined in progressively convergence toward the top 12. The bottom edges of the sides 14 have out-turned substantially horizontal flanges 16.

The sides 14 and the top 12 have an inner sheet 18 made of polymer material such as polystrene, which sheet 18 has the flanges 16 extending in an outward direction from both sides of its bottom edge thereof.

The sheet 18 is covered on its outer surface by a layer 20 of premolded polystrene foam material. This layer 20 is laminated to the sides 14 and the top 12 of the form 10 by any well-known means which provides for a positive bond between the inner surface of the foam layer 20 and the outer surface of the sheet 18. The layer 20 does not extend outwardly of the flange 16 of the sheet.

Figure 2:
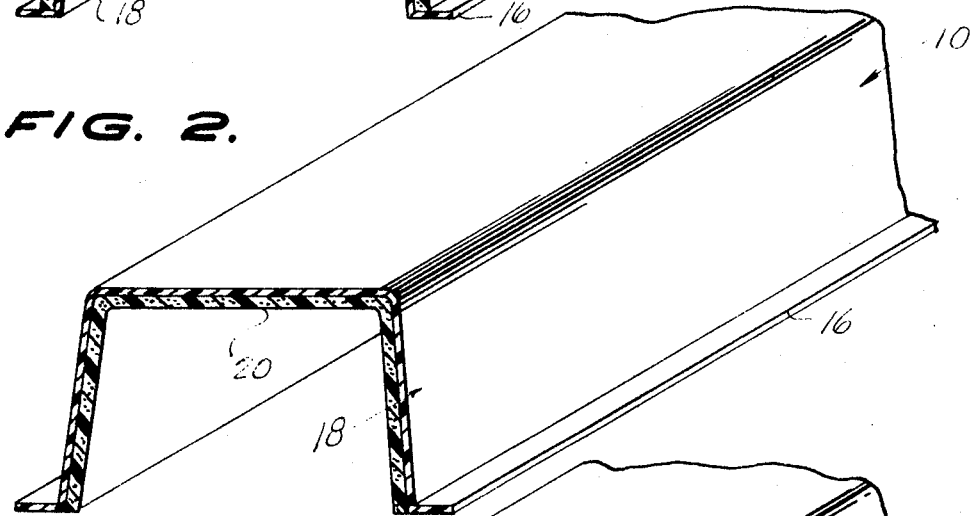
FIG. 2 is a perspective view illustrating another embodiment of the present invention.

Referring to the embodiment of the invention illustrated in FIG. 2, this structure is identical in configuration with that described in connected with FIG. 1. However, in this embodiment of the invention, the sheet 18 is disposed on the outer surface of the polystrene foam layer 20. Again the layer 20 and the sheet 18 are laminated together by thermal expansion molding, or by any well-known method which provides a positive bond between the two parts.

Figure 3:
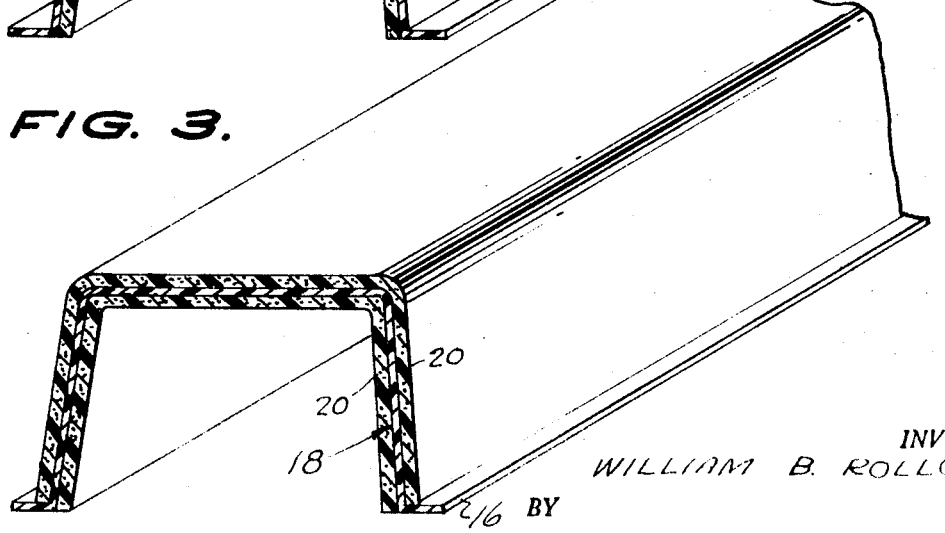
FIG. 3 is a perspective view illustrating a still further embodiment of the present invention.

In the embodiment illustrated in FIG. 3, the sheet 18 is sandwiched between the two layers 20 of the foam material and the sheet 18 and the inner and outer layers of the foam material are laminated together to form a single structure by any well-known means. If desired, the form can be reinforced by inserting or molding within the sheet 18 a metal lath or expanded metal and the like.

Thus, from the foregoing description, it is apparent that the present invention provides a novel, laminated form for use in concrete slab-joist construction consisting of a laminated polymer sheet and a polymer foam layer in which the foam layer can be laminated on either side of the sheet, that is either on the inside of the sheet or the outside of the sheet, or it can be laminated on both sides of a polymer sheet of a premolded shape. Furthermore, the premolded polymer sheet plastic is one which molds compatibly to a polymer foam layer preferably through the process of thermal expansion.

Inasmuch as various changes may be made in the relative form, location and arrangement of the parts without departing from the scope of the invention, it is not meant to limit the invention except by the appended claims:

I claim:

1. A form for use in a concrete slab-joist construction comprising:
    an inverted, substantially U-shaped polymer sheet including a substantially horizontal surface having opposite edges,
    a depending side surface connected to opposite edges of said horizontal surface,
    a horizontal flange connected to each of said side surfaces extending in opposite directions and away from the other side surface, and
    a polymer foam layer laminated to each of said surfaces.

2. The form of claim 1 wherein said sheet is located on the inside of said layer.

3. The form of claim 1 wherein said sheet is located on the outside of said layer.

4. The form of claim 1 wherein there is a second polymer foam layer, with the first mentioned layer being disposed on the inside of said sheet and said second layer disposed on the outside of said sheet.

UNITED STATES PATENT OFFICE
CERTIFICATE OF CORRECTION

Patent No. 3,595,515  Dated July 27, 1971

Inventor(s) William B. Rollow

It is certified that error appears in the above-identified patent and that said Letters Patent are hereby corrected as shown below:

Column 2, line 44, after "surfaces" insert -- said side surfaces are diagonally inclined in progressive convergence to said horizontal surface, said polymer foam layer is laminated to said horizontal and side surfaces in such a manner so as not to cover at least a portion of each of said flanges --.

Signed and sealed this 2nd day of May 1972.

(SEAL)
Attest:

EDWARD M. FLETCHER, JR.  ROBERT GOTTSCHALK
Attesting Officer        Commissioner of Patents